United States Patent
Zen et al.

[11] Patent Number: 5,933,800
[45] Date of Patent: Aug. 3, 1999

[54] APPARATUS FOR RECORDING USER BEHAVIOR IN AN INPUTTING SCHEME

[75] Inventors: James Zen, Pin Tung Hsien; Simon Hwang, Taipei, both of Taiwan

[73] Assignee: Eten Information System Co., Ltd., Taipei Hsien, Taiwan

[21] Appl. No.: 08/762,179

[22] Filed: Dec. 9, 1996

[51] Int. Cl.⁶ .............................. G06F 17/28; G06F 15/38
[52] U.S. Cl. .................................... 704/1; 704/3; 707/535
[58] Field of Search .................................. 704/1, 3, 8, 10; 707/534, 535, 536; 400/110

[56] References Cited

U.S. PATENT DOCUMENTS

| | | | |
|---|---|---|---|
| 4,937,745 | 6/1990 | Carmon | 704/1 |
| 5,060,154 | 10/1991 | Duncan, IV | 704/1 |
| 5,175,803 | 12/1992 | Yeh | 707/535 |
| 5,255,189 | 10/1993 | Woo | 704/1 |

Primary Examiner—Joseph Thomas
Assistant Examiner—Patrick N. Edouard
Attorney, Agent, or Firm—McDermott, Will & Emery

[57] ABSTRACT

The present invention relates to an apparatus for recording user behavior information when an inputting scheme of any kind of language is applied. To extract the user behavior information in the future for achieving the purpose of degrading disadvantage of reentering that caused by misunderstanding or inputting errors. The present invention structurally includes an inputting unit, a word and phrase database unit, a user behavior database unit, a word and phrase generating unit, and a word and phrase outputting unit. After inputting words and phrases information from the inputting unit, the word and phrase generating unit generates meaningful words or phrases by using the words and phrases information, and in accordance with the information of word and phrase database unit, and information from the user behavior database unit. Finally, the word and phrase outputting unit outputs the meaningful words or phrases to the user.

6 Claims, 4 Drawing Sheets

| GROUP | Mandarin Phonetic Symbols |
|---|---|
| 1 | ㄌ and ㄖ |
| 2 | ㄓ and ㄗ |
| 3 | ㄔ and ㄘ |
| 4 | ㄕ and ㄙ |
| 5 | ㄛ and ㄜ |
| 6 | ㄢ and ㄤ |
| 7 | ㄣ and ㄥ |
| 8 | First tone, Second tone, Third tone, Fourth tone, and Neutral tone |

FIG. 3

APPARATUS FOR RECORDING USER BEHAVIOR IN AN INPUTTING SCHEME

BACKGROUND OF THE INVENTION

1. Field of the Invention

The present invention related to an apparatus for recording user behavior information when using inputting scheme of any kind of language. To extract the user behavior information in the future for achieving the purpose of degrading disadvantage of reentering that caused by misunderstanding or inputting errors.

2. Description of the Prior Art

All people who used to input words know that any kind of language's inputting scheme assumes that all users' inputs are correct. Based on this assumption, the scheme displays words or phrases generated from the inputs information.

The assumption "user is always right" remains the verifications of inputting information to the users. Thus, different users will make different mistakes in inputting. For example in using the inputting scheme of mandarin phonetic symbols, those ones who can not exactly realize ambiguous tones of mandarin language., some mandarin tones, such as curly tones (" 坐 and ㄗ", "ㄔ and ㄘ"" ㄕ and ㄙ", and " ㄖ and ㄌ"), some specific vowels tones (" ㄜ and ㄝ", " ㄣ and ㄤ", and " ㄥ and ㄌ"), and four tones and neutral tone of mandarin sound will keep them in trouble for reentering again and again by misunderstanding them. Other kinds of inputting schemes also have the same disadvantage.

SUMMARY OF THE INVENTION

The principle object of the invention is to provide an inputting apparatus with capability of storing information of user behavior while an inputting scheme of any kind of language is applied.

Structure of the invention includes an inputting unit, a word and phrase database unit, a word and phrase generating unit, a word and phrase outputting unit, and a user behavior database unit.

The user behavior database unit stores information according with inputting errors when a user makes mistakes in realizing of what he wants to input, and extract the stored information to remove disadvantage of reentering caused by misunderstanding them.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 represents a category table for ambiguous tones of mandarin language.

DESCRIPTION OF THE PREFERRED EMBODIMENT

Figure 1:
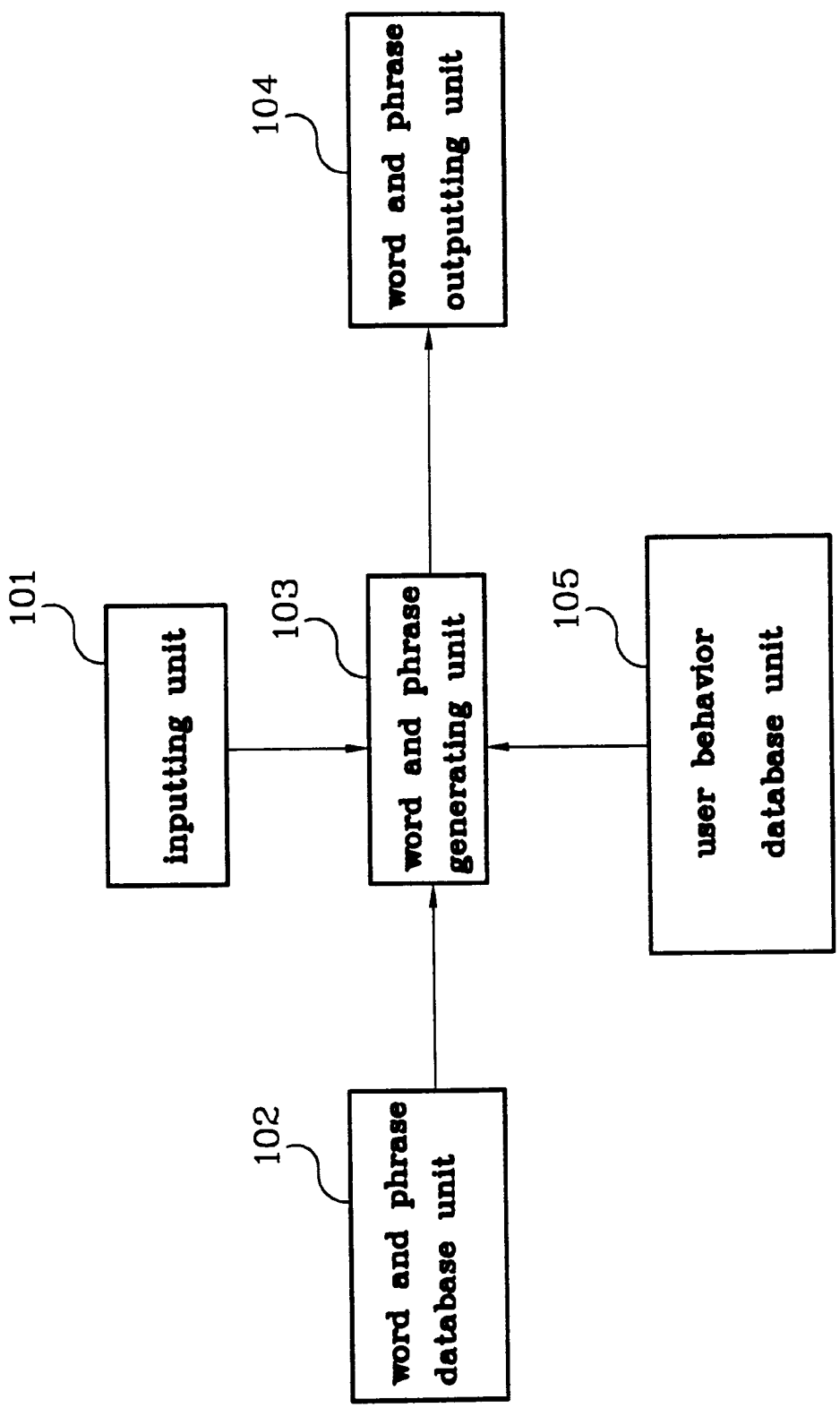
FIG. 1 is a schematic diagram describing an apparatus according to the present invention which records user behavior while an inputting scheme is applied.

Referring to FIG. 1, a schematic diagram of the user behavior recording apparatus ("recording apparatus" for short) of the invention, includes an inputting unit 101, a word and phrase database unit 102, a word and phrase generating unit 103, a word and phrase outputting unit 104, and a user behavior database unit 105. A user inputs word and phrase information through the inputting unit 101, based on the word and phrase information, and in accordance with information from the word and phrase database unit 102 and the user behavior database unit 105, all possible words or phrases generated by the word and phrase generating unit 103 will be output through the word and phrase outputting unit 104.

Clearly, the difference between the novel structure and the conventional is the additional user behavior database unit 105, which provides a capability of recording a user behavior of misunderstanding while an inputting scheme of any kind of language is applied.

For example, when the popular inputting scheme of mandarin phonetic symbols is applied; because some users can not distinctly realize mandarin curly tones " 坐 and ㄗ", or vowels " ㄣ and ㄤ", reentering caused by misunderstanding such ambiguous tones becomes a boring thing. The user behavior database unit 105 is exclusive used for removing this disadvantage. Not only stores those information of misunderstanding about ambiguous tones, but extracts the information to give a hand for removing the disadvantage of reentering each time when the phonetic inputting scheme is applied.

Examples of applying the inputting scheme of mandarin phonetic symbols are applied for explaining the operations of the recording apparatus in the following paragraphs.

FIG. 3 shows a category table of ambiguous tones in mandarin language used in the invention. In the table, four groups of curly tones, include " ㄉ and ㄊ", " 坐 and ㄗ", "ㄔ and ㄘ", and "ㄕ and ㄙ"; three groups of vowel tones, include " ㄜ and ㄝ", " ㄣ and ㄤ", and " ㄥ and ㄌ"; and ambiguous sound, include "first tone, second tone, third tone, and fourth tone" of the mandarin language, which are easily misunderstood by users. In implementations, by setting indicating flag of a set of ambiguous tones to indicate a misunderstanding about the set of ambiguous tones is detected.

Figure 2A:
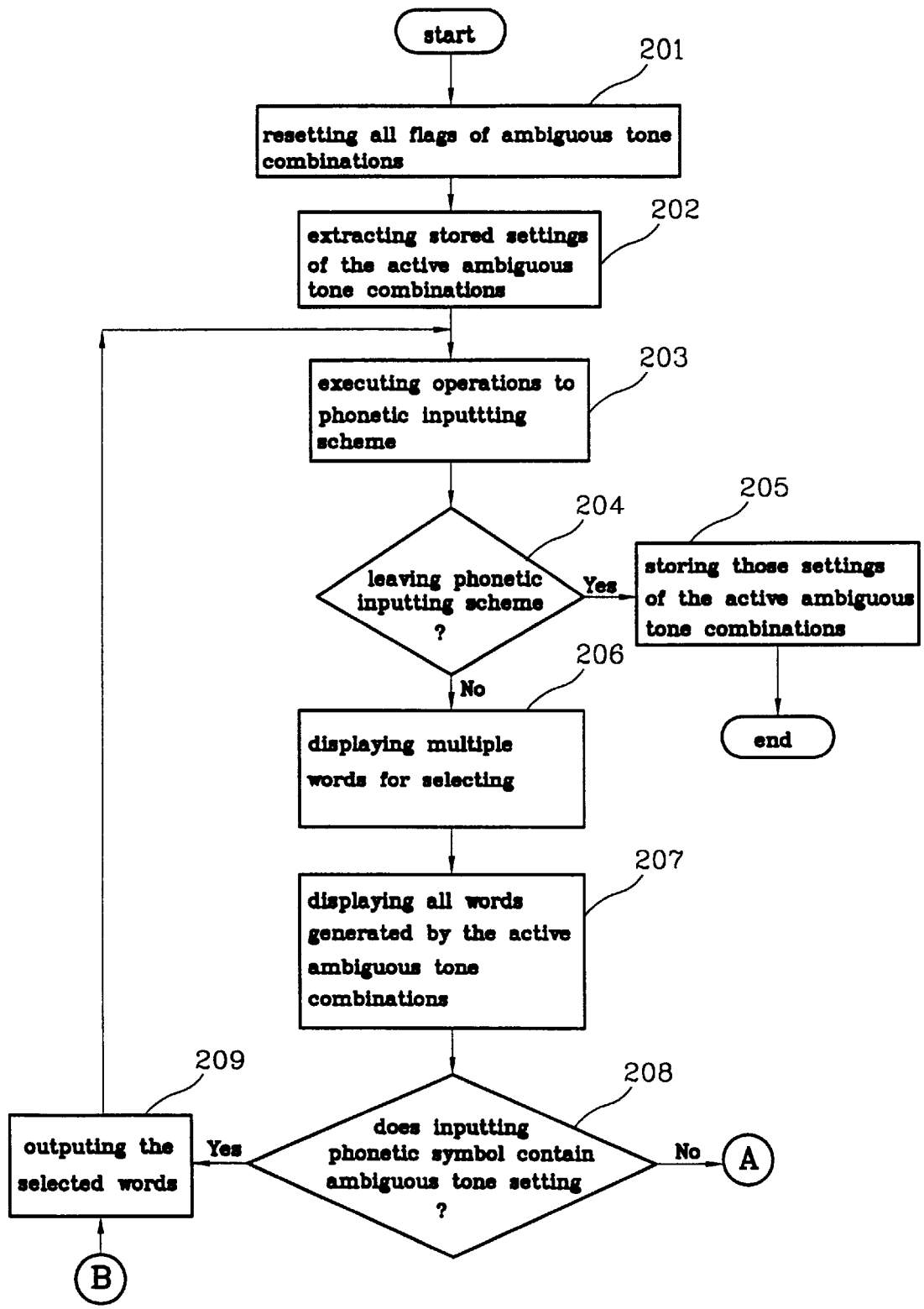
FIG. 2A is a flow chart summarizing operations of the apparatus for recording user behavior while the inputting scheme of mandarin phonetic symbols is applied.
Figure 2B:
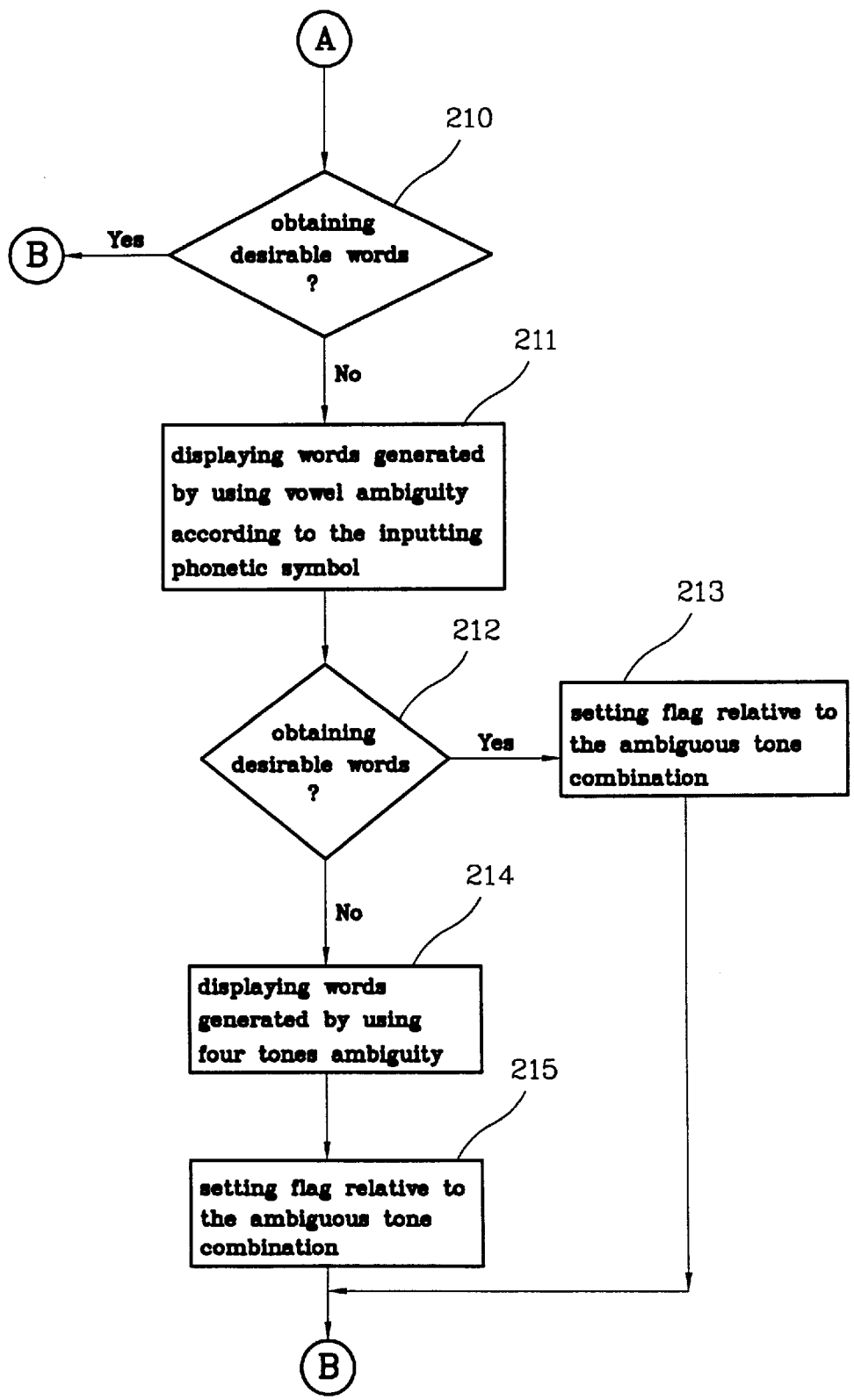
FIG. 2B continuously describes the operations in FIG. 2A.

FIG. 2A represents a flow chart describing the operations of generating and displaying words or phrases for selecting based on user's inputs, or from ambiguous tones. FIG. 2B describes operations of the recording apparatus when a user misunderstands the ambiguous tones.

When the phonetic inputting scheme is applied, the recording apparatus first resets all indicating flags according to the 8 groups in the FIG. 3 (step 201), and then extracts active settings last time (step 202) to set related indicating flags of the active settings for denoting which groups of ambiguous tones are misunderstood by the user (step 203). If the user wants to quit the phonetic inputting scheme (step 204), all active settings through the inputting procedure will be saved before exiting (step 205).

Because some mandarin words (or phrases) share the same tones but different in their meanings, it is necessary for the recording apparatus to display multiple words (or phrases) after receiving the user' inputs (step 206). Furthermore, if at least a indicating flag is set, all generated ambiguous words (or phrases) must be displayed to the user's for selecting usage (step 207). In addition, if the recording apparatus has stored information of misunderstanding settings, all words generated by using the settings also being displayed for selecting (step 208).

If user can choose desired word (or phrase) from the displayed words (or phrases) (step 209 to label A), and no indicating flag is active (step 211 to label B), the selected word (or phrase) will be sent to a related application (step 210), then waits following inputs from the user (step 203). Similarly, if user can choose a desired word (or phrase) from the displayed words (or phrases) (step 209), and at least a indicating flag is active, the selected word (or phrase) will be sent to the related application (step 210), then waits another inputs from the user (step 203).

If the desired word (or phrase) combinations by the inputting phonetic information is absent from the displayed words, it implies that the inputting information belongs to one group of those ambiguous tones, and furthermore, the user does not exactly realize the difference among members of the group of the ambiguous tones. The recording apparatus generates more words (or phrases) depended on the active group of ambiguous tones to the user (step 212). The indicating flag of one of groups from the first group through seventh group in the FIG. 3 will be set, if the user obtains the desired word this time (step 213, 214). In addition, the recording apparatus also displays these words generated from the ambiguous tones in accompanied by words from the inputting phonetic information.

The user does not obtain the desired word after displaying those words (or phrases) generated from the ambiguous tones, it implies that the user may not exactly realize the difference among four tones in mandarin, words (or phrases) generated from four the ambiguous tones (eighth group in FIG. 3) will be displayed to the user. Similarly, the recording apparatus also displays words generated from the four ambiguous tones in accompanied by words from inputting phonetic information (step 215). If the user can select the desired words (or phrases) he wants (step 216), the recording apparatus will set the relative flag to the ambiguous tone combinations (step 217), and then go back to wait following inputs from the user (passes label B to step 203).

If the user still can not obtain his desired words (or phrases) (step 216), it implies that the user's inputs are incorrect. For example; combinations of phonetic symbols of the mandarin phrases "滑稽" are "ㄍˋㄨ, third tone", "ㄐㄧˋ—, first tone", but the user inputs "ㄏˋㄨㄚ, second tone" and "ㄐㄧˋ—, first tone", the recording apparatus will generate words by using information of misunderstanding settings (step 218).

If the user obtains his desired words (or phrases) (step 219), the information of misunderstanding will be stored by the recording apparatus (step 220), and go back to wait following inputs from the user (passes through label B to step 203). If the user can not obtain the words he desires (step 219), it implies that incorrect inputs existed in the user's inputs, or the recording apparatus does not record this misunderstanding setting. The recording apparatus will send error messages to the user, and urge him to modify his input information (step 221). The information misunderstanding setting will also be stored by the recording apparatus (step 220), and go back to wait following inputs from the user (passes through label B to step 203).

Give an example about inputting the mandarin word '珠' for further explaining the operations of the recording apparatus. Assume inputting order of the user is "ㄗ, ㄗ, first tone", and the indicating flag of "ㄓ and ㄗ" has not been set, yet. Because the indicating flag of "ㄓ and ㄗ" is inactive, no word based the ambiguous tones is generated for user's selection in the step 207, and the user do not discover the word "珠" he desires (step 210).

Therefore, the recording apparatus generates words by using the ambiguous tones "ㄓ and ㄗ" for user's selection (step 211), the word "珠" appears this time (step 212), and furthermore, the indicating flag of the ambiguous tones "ㄓ and ㄗ" is set to active in the same time (step 213). Owing to the indicating flag of the ambiguous tones "ㄓ and ㄗ" is active, the recording apparatus will provide words generated from the ambiguous tones to the users in the step 207. For example, if the user inputs a mandarin word "昭" in the order of "ㄗ, ㄠ, first tone", the word "昭" will appear for selection in the step 207 because the indicating flag of the ambiguous tones "ㄓ and ㄗ" is active.

Another example for explaining misunderstanding settings is also given in the following by using a mandarin phrase "龜裂". Assume the input phonetic information from the user is "ㄍˋㄨˋㄟ, first tone" and "ㄉˋ—ˋㄝ, fourth tone" (the correct combinations are "ㄐˋㄩˋㄣ, first tone" and "ㄉˋ—ˋㄝ, fourth tone"). Because the input error is cause by misunderstanding to the phonetic combinations, the correct phrase is not obtained by the recording apparatus until step 218. The misunderstanding information will be stored by the recording apparatus, and be displayed to the user next time inputting the same phrase in the step 208.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. Apparatus for recording user behavior when a phonetic inputting scheme of mandarin language is applied, wherein said apparatus comprises:

inputting means for receiving inputting information of words and phrases;

word and phrase storing means for storing combination information of words and phrases;

user behavior storing means for storing user behavior information when said phonetic inputting scheme is applied, said user behavior information comprising a plurality of sets of information of mandarin ambiguous tones, wherein said sets comprise:

"ㄌ and ㄖ";
"ㄓ and ㄗ";
"ㄑ and ㄔ";
"ㄕ and ㄙ";
"ㄛ and ㄜ";
"ㄢ and ㄤ";
"ㄣ and ㄥ"; and "first tone, second tone, third tone, fourth tone, and neutral tone" of the mandarin language;

word and phrase generating means responsive to said inputting information of words and phrases, said combination information of words and phrases, and said user behavior information for generating outputting information of word and phrase; and word and phrase outputting means responsive to said outputting information of word and phrase for generating a display information.

2. The apparatus according to claim 1, wherein said outputting information of words and phrases further comprising words and phrases generated by said user behavior information.

3. The apparatus according to claim 1, wherein said user behavior information comprises all information of misunderstanding about said language said inputting scheme is applied.

4. The apparatus according to claim 1, wherein said user behavior information comprises all information of inputting errors about said language said inputting scheme is applied.

5. A method for recording information of user behavior when a user applies an inputting scheme of mandarin phonetic symbols, said method comprises the steps of:

inputting a set of combination information of phonetic symbols;

generating a plurality of basic words and phrases with the same tone by using said combination information of phonetic symbols;

generating a plurality of spreading words and phrases with ambiguous tones when a desired word is absent from said basic words and phrases, said ambiguous tones being divided into a plurality of subsets, wherein said subsets comprise:

"ㄉ and ㄖ";

"ㄓ and ㄗ";

"ㄔ and ㄘ";

"ㄕ and ㄙ";

"ㄛ and ㄜ";

"ㄢ and ㄤ";

"ㄣ and ㄥ"; and

"first tone, second tone, third tone, fourth tone, and neutral tone" of the mandarin language; and storing active information for indicating said ambiguous tones is active.

6. A method for displaying mandarin ambiguous tones, said method comprises the steps of:

inputting a set of combination information of phonetic symbols;

inputting a set of ambiguous information;

generating a plurality of words with ambiguous tones by using said set of ambiguous information; and displaying said words with ambiguous tones, wherein said ambiguous tones comprise:

"ㄉ and ㄖ";

"ㄓ and ㄗ";

"ㄔ and ㄘ";

"ㄕ and ㄙ";

"ㄛ and ㄜ";

"ㄢ and ㄤ";

"ㄣ and ㄥ"; and

"first tone, second tone, third tone, fourth tone, and neutral tone" of the mandarin language.

* * * * *

UNITED STATES PATENT AND TRADEMARK OFFICE
CERTIFICATE OF CORRECTION

PATENT : 5,933,800 Page 1 of 2

DATED : August 3, 1999

INVENTOR(S) : Zen et al

It is certified that error appears in the above-identified patent and that said Letters Patent is hereby corrected as shown below:

In the drawings, Sheet 3 of 4, consisting of Fig. 2B, should be replaced with the corrected Fig. 2B, as shown on the attached page.

Signed and Sealed this

Twentieth Day of February, 2001

*Attest:*

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO. : 5,933,800

DATED : August 3, 1999

INVENTOR(S) : Zen et al.

Page 2 of 2

It is certified that error appears in the above-identified patent and that said Letter Patent is hereby corrected as shown below:

Sheet 2 of 4, replace FIG. 2A with the following:

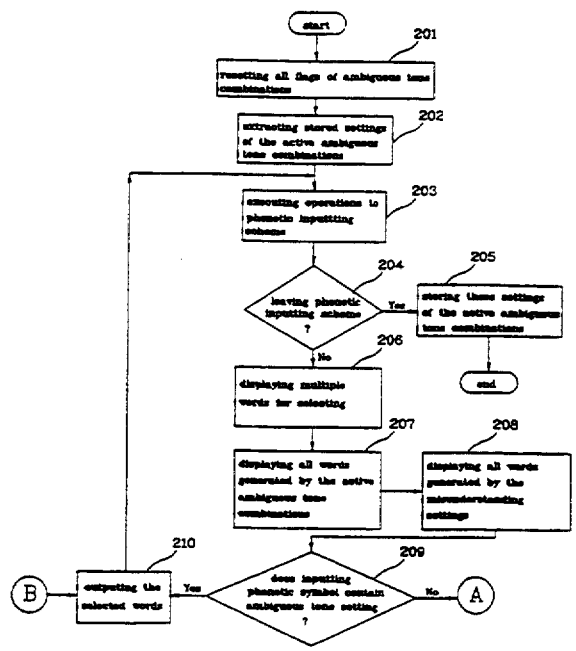

FIG. 2A